United States Patent
Schmitt et al.

[15] 3,673,273
[45] June 27, 1972

[54] PLASTIC OF POLYAMIDE AND EPOXY RESIN

[72] Inventors: Karl Schmitt, Herne; Fritz Gude, Wanne-Eickel; Siegfried Brandt, Herne, all of Germany

[73] Assignee: Scholven-Chemie Aktiengesellschaft

[22] Filed: July 3, 1968

[21] Appl. No.: 742,175

[30] Foreign Application Priority Data

July 6, 1967 Germany..........................SCH 40972

[52] U.S. Cl....................260/830 P, 260/78 R, 260/830 TW
[51] Int. Cl.............................................C08g 45/12
[58] Field of Search.............................................260/830 P

[56] References Cited

UNITED STATES PATENTS

| | | | |
|---|---|---|---|
| 3,294,759 | 12/1966 | Gabler | 260/78 |
| 3,352,913 | 11/1967 | Schmitt | 260/78 |
| 3,458,481 | 7/1969 | Reichold | 260/830 |
| 3,475,367 | 10/1969 | Tringali | 260/830 |
| 3,462,337 | 8/1969 | Gorton | 260/830 |
| 3,554,944 | 1/1971 | Helm | 260/830 P |
| 3,616,963 | 11/1971 | Sinott | 260/830 P |

FOREIGN PATENTS OR APPLICATIONS

| | | | |
|---|---|---|---|
| 986,190 | 3/1965 | Great Britain | 260/830 |
| 48,112 | 4/1964 | Poland | 260/830 |

*Primary Examiner*—Paul Lieberman
*Attorney*—Burgess, Dinklage & Sprung

[57] ABSTRACT

Process of producing plastics by reacting polyamides with epoxy resins, characterized by the fact that the diamine used to form the polyamide employed consists of 20 – 100 percent of 1-amino-3-aminomethyl-3,5,5-trimethyl cyclohexane and said polyamide constitutes 10 – 99.8 percent of the mixture. The products can be shaped articles.

9 Claims, No Drawings

PLASTIC OF POLYAMIDE AND EPOXY RESIN

Homogeneous polyamides of straight-chain diamines and dicarboxylic acids, of aminocarboxylic acids and of lactams are partially crystalline. They are insoluble in most solvents and incompatible with other polymeric materials.

It is known that soluble polyamides can also be produced by co-condensation. They dissolve in alcohols and show even a limited compatibility with other polymers, and particularly with epoxy resins. Accordingly it is possible to react the polyamides with these resins at elevated temperature and produce new plastics having improved properties.

In order to obtain hard plastics of dimensional stability within a short period of time which are of interest from an industrial standpoint, from the mixture of the two components, it is necessary to add epoxy resin hardeners, for instance dicyan-diamide.

If the reaction of these copolyamides with epoxy resins is brought about with hardening agents at elevated temperature, crosslinking at the amide groups takes place (J. Appl. Polym. Sci. 8, 1287 – 95, 1964), the mixture becoming insoluble. The extent of the crosslinking is, however, slight. The said resin combinations have therefore become known only as adhesives.

Up to now it was, however, not possible to react the known copolyamides with epoxy resins even at lower temperature, or to obtain products usable for shaped articles in this reaction.

It has been found that polyamides whose amine component consists in whole or in part of the mixture of stereo isomers of 1-amino-3-amino-methyl-3,5,5-trimethylcyclohexane (known under the name of "isophorodiamine", in the following referred to as IPD and disclosed in U.S. Pat. No. 3,352,913) start to react even at normal temperature with epoxy compounds which contain more than one epoxy group per molecule. The reaction products immediately crosslink with each other so that the mixtures still remain fusible and soluble and can still be worked. In this respect they behave in the same manner as the known mixtures of epoxy resins and low-molecular polyamines which only after some time give highly crosslinked rigid resins. Low-molecular polyamines, however, have a high vapor pressure and are injurious to health and can therefore be worked only when precautionary measures are applied.

The polyamides of IPD used in accordance with the invention do not have these disadvantages. Their mixtures with epoxy compounds give plastics having excellent technical properties. They are characterized by their hardness and toughness. There should be particularly emphasized their lack of color and their dimensional stability at elevated temperature exceptionally high for polyamide-epoxide combinations. The Vicat softening point are, as a rule, about 20°–30° higher than in the case of the combination of the same epoxy compound with a corresponding polyamide which has been prepared without the use of at least 20% IPD. The high surface gloss makes use for heat-resisting coatings possible.

As can be noted from the foregoing, the plastics of the invention consist essentially two components. Component I is a polyamide of IPD and component II is an epoxy resin. In accordance with the invention, the percentage of the components I is preferably about 75 – 99.8 percent if the plastics are to be only weakly crosslinked, if at all, while in the case of the more strongly crosslinked plastics, it is preferably about 10 – 75 percent, so that the percentage of the components I is preferably in all cases between 10 and 99.8 percent. The most favorable results are obtained with an amount of IPD Polyamide of between 50 and 97 percent. By the simultaneous use of aliphatic, araliphatic, aromatic or other cycloaliphatic diamines as component of the polyamide, such as hexamethylene diamine, 1,4-diaminocyclohexane, the properties can be varied. The amount of IPD should, however, constitute at least 20 percent of the amine in the polyamide. As dicarboxylic acids, use may be made of aliphatic, aromatic and hydroaromatic dicarboxylic acids, such as, for instance, adipic acid, 2,4,4-trimethyl adipic acid, decane dicarboxylic acid terephthalic acid, and cyclohexane-1,4-dicarboxylic acid. The acids may also be used in the form of their esters. Aminocarboxylic acids — also in the form of their lactams — can also be incorporated, such as, for instance, $\epsilon$-aminocaproic acid or laurolactam. The polyamides can be polyamides as are disclosed in U.S. Pat. No. 3,352,831.

Furthermore, up to 15 percent of the diamine component of the polyamides can be replaced by diols. There enter into consideration, for instance, ethylene glycol, propylene glycols, butylene glycols, decane diols, tridecane diols, etc., as well as branched glycols, such as, for instance, 2,2-dimethyl butane diol, trimethyl hexamethylene glycol, etc., or diols which bear at the same time also ether oxygen, such as, for instance, triethylene glycol, dipropylene glycol, etc., as well as mixtures of all of these compounds.

One particularly advantageous embodiment of the process of the invention proceeds from low-molecular polyamides having average molecular weights of less than 3,000, 70 – 100 percent of whose terminal groups are amino groups. Due to their low softening range and their good solubility, they can be mixed even at low temperatures with the reactive resins, so that highly reactive epoxy resins can be used.

Adducts of high elasticity are obtained by the process of the invention when reacting with epoxy resins polyamides having molecular weights of between 1,500 and 10,000, and in particular between 2,000 and 7,000.

The epoxy compounds which can be used as component II are sufficiently known. There can be used, for instance, glycidyl ethers of polyhydric phenols, such as the bisglycidyl ether of diphenylol propane and its polymers, glycidyl esters, for instance of isophthalic acid, epoxidized hydrocarbons, such as vinyl cyclohexene diepoxide, and glycidyl ethers of phenol formaldehyde resins. Mixtures of different epoxy compounds can also be employed. Monoepoxy compounds may be simultaneously employed in small quantities.

By mixing with fillers, pigments and plasticizers, the properties of the shaped bodies and coatings produced in accordance with the invention can be varied in known manner.

The preparation of shaped bodies and coatings is effected by mixing the two components I and II possibly in a solvent and thereupon shaping or making into a film. The reaction can be accelerated by heating to 50°– 200° C. By the addition of epoxy-resin hardeners which activate the component II, the reaction is also accelerated.

EXAMPLES

1. Forty parts by weight of a polyamide prepared from 43 parts by weight of adipic acid and 57 parts by weight of IPD were dissolved in 80 parts by weight of methanol. The solution was mixed with 15 parts by weight of an epoxy resin of an epoxy value of 0.36 prepared from diphenylol propane and epichlorhydrin. The resin solution was formed into a paste with 10 parts by weight of $TiO_2$ and 0.5 parts by weight of a finely divided silica gel and applied to a carefully cleaned steel plate. After blowing with air, the film was heated for one-half hour at 140° C. The film was pure white, hard, had a high gloss and was adherent. The König pendulum hardness was 198 seconds. The same degree of hardness is reached after 6 days at 25° C.

2. Forty parts by weight of a copolyamide prepared from 36 mol% AH salt, 44 mol% $\epsilon$-aminocaproic acid, 8.4 mol% adipic acid and 11.6 mol% IPD are kneaded in the hot with 5.6 parts by weight of an epoxy resin of an epoxy value of 0.48 prepared from diphenylol propane and epichlorhydrin. The mixture is pressed in a plate mold and heated for one-half hour at 140° C. The product is a colorless plate.

The Vicat softening point is 136° C.

3. Forty parts by weight of a copolyamide prepared from 45 mol% AH salt and 55 mol% $\epsilon$-aminocaproic acid are kneaded in the hot with 5.6 parts by weight of the epoxy resin used in Example 2. The mixture is pressed in a plate mold and heated for 2 hours at 170° C. to produce a plate.

The Vicat softening point is 84° C.

4. Forty parts by weight of a polyamide of an average molecular weight of 1,020 prepared from 43 mol% adipic acid and 57 mol% of IPD are kneaded with 30 parts by weight of an epoxy resin of and epoxy value of 0.36 prepared from diphenylol propane and epichlorhydrin. The mixture is pressed in a plate mold and heated for one-half hour at 140° C. to produce a plate.

The Vicat softening point of the colorless product is 163° C.

5. Forty parts by weight of a polyamide prepared from 57 mol% IPD, 33 mol% decane dicarboxylic acid and 10 mol% terephthalic acid are dissolved together with 20 parts by weight of the epoxy resin used in Example 2 in 100 parts by weight of methanol. A plasticized PVC sheet is coated with this solution. The colorless coating is hard and flexible and adherent after it is heated to 80° C.

Unless otherwise indicated percentages are in weight percent.

What is claimed is:

1. A crosslinked plastic which is the reaction product of a mixture consisting essentially of a polyamide and an epoxy compound containing at least two epoxy groups per molecule, hardenable at normal temperature in the absence of an epoxy hardener, the polyamide including residues of 1-amino-3-aminomethyl-3,5,5,-trimethylcyclohexane, said residues being about 20–100 percent of the diamine residues of the polyamide, said polyamide being about 10–99 percent of the polyamide plus epoxy compound.

2. Plastic according to claim 1, the polyamide having an average molecular weight of less than 3,000, and at least 70 percent of the terminal groups of the polyamide being amino groups.

3. Plastic according to claim 1, the polyamide containing diol residues, the diol residues being up to 15 percent of the diamine residues of the polyamide.

4. Plastic according to claim 2, the polyamide containing diol residues, the diol residues being up to 15 percent of the diamine residues of the polyamide.

5. PLastic according to claim 1, the epoxy compound being an epoxy resin.

6. Shaped article of plastic according to claim 1.

7. Plastic according to claim 1, the moleculer weight of the polyamide being 1,500–10,000, and at least 70 percent of the terminal groups of the polyamide being amino groups.

8. Plastic according to claim 1, the molecular weight of the polyamide being 1,500–10,000.

9. Plastic according to claim 7, the polyamide being a polyamide of a dicarboxylic acid.

* * * * *

UNITED STATES PATENT OFFICE
CERTIFICATE OF CORRECTION

Patent No. 3,673,273　　　　　　　　　　Dated　June 27, 1969

Inventor(s) Karl Schmitt Et Al.

It is certified that error appears in the above-identified patent and that said Letters Patent are hereby corrected as shown below:

Col. 4, line 2, "10-99 percent" should be "10-99.8 percent".

Signed and sealed this 5th day of December 1972.

(SEAL)
Attest:

EDWARD M. FLETCHER, JR.　　　　　　　　ROBERT GOTTSCHALK
Attesting Officer　　　　　　　　　　　Commissioner of Patents